June 25, 1963 E. E. BROBERG 3,094,894
PIERCING AND TAPPING SCREW WITH GROOVE TO FACILITATE TAPPING
Original Filed April 11, 1955
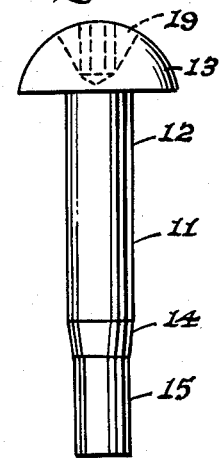
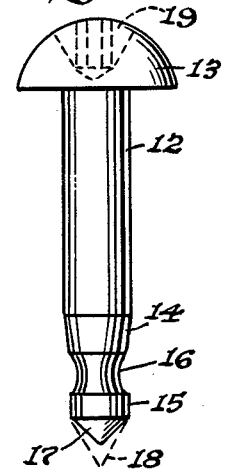
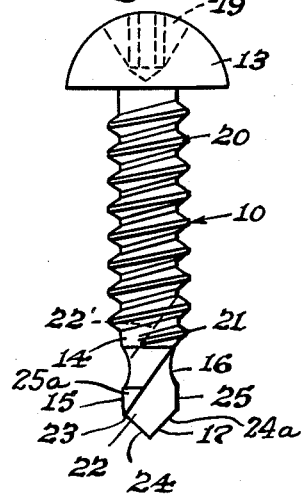
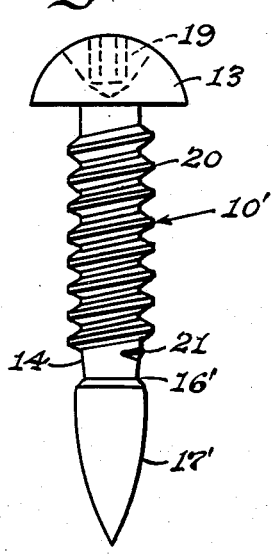
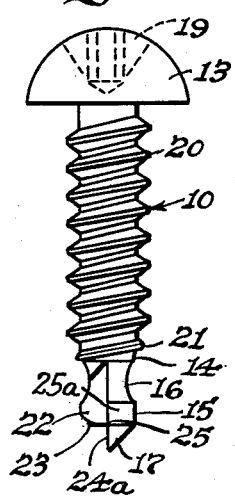
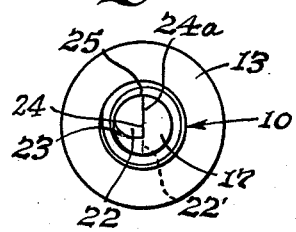
Inventor
Elmer E. Broberg
By Olson, Mecklenburger, von Holst,
Pendleton & Neuman, Attys.

3,094,894
PIERCING AND TAPPING SCREW WITH GROOVE TO FACILITATE TAPPING

Elmer E. Broberg, Rockford, Ill., assignor to Elco Tool and Screw Corporation, Rockford, Ill., a corporation of Illinois
Continuation of application Ser. No. 500,402, Apr. 11, 1955. This application Feb. 28, 1961, Ser. No. 92,237
4 Claims. (Cl. 85—47)

This application is a continuation of my copending application Serial No. 500,402, filed April 11, 1955 and now abandoned.

This invention relates to hole producing and tapping screws and is more particularly concerned with improvements on the screw disclosed in my application, Serial No. 255,903, filed November 13, 1951, and now abandoned, for which a continuation-in-part application, Serial No. 551,475, filed December 6, 1955 and now abandoned, was substituted, for which in turn a pending continuation application, Serial No. 720,796, filed March 11, 1958, and now abandoned, has been substituted.

Drilling and tapping and piercing and tapping screws are intended for use in all kinds of sheet metal work and repair work and fastening generally. They are adapted to be entered in plastic sheet materials and various kinds of thin sheet metals, namely, copper, aluminum, steel and brass (sheet or cast). These screws are adapted to be driven with ordinary power screw drivers but are even better adapted for use with what are known as gun drills, where the bit is operated first as a hammer to make the screw point pierce the work and is then turned to drive the screw home. For some work, and especially when a gun drill is not available, these screws can be first struck with a hammer to pierce the hole and then screwed home with an ordinary screw driver.

The principal object of my invention is to improve the screw disclosed in my previous application by annularly grooving the same next to the threaded portion of the shank to a predetermined width in relation to the thickness of the sheet metal to be penetrated with a view to:

(1) Improving the chances of the screw thread taking hold in the sheet metal around the freshly made hole as a result of the sudden lunge which the screw takes in the driving of it when the pointed tip portion gets through the sheet metal and the grooved portion immediately behind the tip portion slips freely through the hole in the sheet metal, and (2) Eliminating troublesome protruding burrs that were otherwise apt to be left on the shank when one side of the end portion of the screw is milled off diagonally, and particularly when such milling extends only up to the first thread.

Referring to the accompanying drawing:

FIG. 1 is an enlarged side view of a screw blank;

FIG. 2 is a similar view showing the blank of FIG. 1 pointed and grooved;

FIGS. 3 and 4 are side views on the same scale as FIGS. 1–2 of the finished screw made in accordance with my invention, FIG. 3 including a dotted line illustration of how much farther the diagonal milling off of one side may be carried, namely, up through the second thread;

FIG. 5 is an end view of FIG. 4, indicating again by a dotted line how the end of the screw appears when the milling operation is extended farther as shown by the dotted line in FIG. 3;

FIG. 6 is a view on the same scale as FIGS. 1–5 showing the end portion of the combination tool used in the grooving and pointing operation to produce blanks like that shown in FIG. 2, and FIG. 7 is a side view of another screw similar to that of FIGS. 3–5 but omitting the milling operation.

The same reference numerals are applied to corresponding parts in these views.

The screw indicated generally by the reference numeral 10 in FIGS. 3, 4 and 5 is made from a steel blank like that shown at 11 in FIG. 1, said blank comprising a cylindrical shank 12 with a head 13 of any suitable shape on its upper end, the shank 12 being tapered near its lower end, as indicated at 14, and terminating in a reduced concentric cylindrical lower end portion 15, all as clearly appears in FIG. 1. A combination grooving and pointing tool T shown in FIG. 6 is used in cutting the annular groove 16 in the end portion 15 next to the taper 14 and simultaneously cutting the conical tip or point 17 in a predetermined spaced relationship to the groove 16, the tool T having an arcuate portion 16a to cut the groove 16 and an angularly extending edge 17a corresponding in its angularity to the angle to which the tip portion 17 is to be pointed, a variation being indicated at 18 in dotted lines in FIG. 2 and a corresponding variation at 18a in FIG. 6. The shape of the head 13 depends upon the particular use to which the screw is to be put, the one herein shown being flat on the bottom to engage a flat surface on the work, and having a cross-shaped socket 19 in the center of the top adapted to receive the cross-shaped bit of a screw driver.

The shank 12 is rolled between dies to form a fairly coarse thread 20 thereon extending helically downwardly from the head 13 through the major portion of the length of the shank including the tapered portion 14. The thread shown is a conventional V-thread that is best adapted for the self-tapping function. In the formation of the thread 20 the lower end portion 21 which does the tapping, tapers off to zero height on the taper 14 as required for good tapping. A rectilinear groove 22 is milled in one side of the lower end portion 15 of the shank extending from the conical tip portion 17 upwardly at an acute angle to the longitudinal axis of the screw to define two cutting or piercing edges at the lower end of this groove, namely a sharp piercing edge 23 and contiguous therewith and in a vertical plane at right angles thereto a V-shaped cutting or drilling edge 24.

It will be seen in FIGS. 4 and 5 that one side of the groove 22 is in the diametrical plane of the screw and the axis of rotation of the screw lies in this plane, so that one half of the V-shaped cutting or drilling edge 24 numbered 24a is adapted to serve as a drill lip in drilling a hole in the sheet metal or other material to be drilled and tapped. Immediately after the drill tip portion 24 of the screw gets through the sheet metal, the lower end portion of the screw does a reaming operation to round out the hole, the edge 25 on one side of the land portion 25a serving as a reamer, after which the lower end portion 21 of the thread 20 taps the freshly drilled and reamed hole and then the thread 20 threads into it. The annular groove 16, being of a predetermined width in relation to the thickness of the sheet metal or other material to be drilled and tapped, greatly facilitates the taking hold of the end portion 21 of the screw thread, partly because of the groove making the end portion 21 of the thread stand out in bolder relief so that it can take hold better but mainly because of the sudden lunge which the screw is given when the same pressure that is applied on the screw in the drilling and reaming of the hole continues to be applied at the instant after the hole is completed enough for the end portion of the screw to break through, the groove 16 greatly reducing the resistance to inward movement of the screw. There is an even better opportunity for the thread to take hold when the groove 22 is milled farther up, as indicated at 22′ in FIGS. 3 and 5, to a point beyond the second thread.

That makes the last two threads 21 stand out even better than with the other milling as at 22 and then they are more certain to take hold and tap in the first turn of the screw after the hole is produced. The groove 22 provides chip clearance for drilling, reaming and tapping. The edge 23 is eliminated when the milling is carried farther up on the shank as at 22' and I have found that screws made this way drill through the sheet metal most satisfactorily, and the exposure of the last two threads on the reaming edge 25 helps to insure their taking hold immediately for tapping.

In the production of screws 10, the blanks 11 are first grooved and pointed, as indicated at 16 and 17, after which they are threaded, as at 20—21 by rolling between parallel dies, and are then finally milled off on one side of the lower end portion as at 22 or 22' at the inclination shown. Except for the combination grooving and pointing tool T which I have found greatly facilitates the grooving and pointing of the blanks, as shown in FIG. 2 the operations mentioned before are capable of being performed easily with presently available equipment, so that these screws can be produced in quantities at low or at least competitive costs. The grooving at 16 as previously mentioned, I have found reduces likelihood of burrs being left on the shank portion 15 after the milling of the groove 22. Such burrs are not left when the milling is done to 22'. The finished screws made either way are suitably hardened to prevent blunting of the piercing edges 23 or 23—24, reaming edge 25, and screw threads 20—21.

Referring to FIG. 7, the screw 10' is closely similar to screw 10 of FIGS. 3–5 and is made from a blank similar to blank 11 and in a similar way, only omitting the milling operation, because there is no rectilinear groove 22, the smooth tapered bullet-like tip 17' being elongated and its taper being preferably but not necessarily on a radius as shown, while the annular groove 16' behind the tip is of a slightly different form from groove 16 but serves substantially the same purpose in so far as insuring the end thread or threads biting into the metal or other material around the freshly pierced hole is concerned. This screw 10' can be used in any thinner materials wherever the drilling and reaming action of the grooved tip 17 is not necessary, namely, where only a hammer blow is needed to pierce the hole in the sheet metal or other material and start the end 21 of the thread 20 in the hole, after which the thread taps the hole and threads into it as the screw is turned with a screw driver. This screw 10' is otherwise the same as screw 10 and there are many kinds of work where the two kinds of screws 10 and 10' can be used interchangeably.

It is believed the foregoing description conveys a good understanding of the objects and advantages of my invention. The appended claims have been drawn to cover all legitimate modifications and adaptations.

I claim:

1. A hole-piercing and tapping screw for use in thin sheet metals including a head and a threaded shank integral therewith having an upper holding section and a lower entering and tapping section, the threads on the shank being V-shaped and of relatively coarse pitch and the thread convolutions on said entering section diminishing in outside diameter but having sharp peripheries all the way to the end to facilitate entrance into an unthreaded hole and start the tapping thereof, the lower end of said entering and tapping section having a metal piercing tapered point and having an annular groove of appreciable width and depth in relation to the thickness of the sheet metal to be penetrated provided therein above the metal piercing tapered point and immediately below the threads on the shank, said pointed and grooved lower end section being recessed on one side to define a substantially right angle groove, one side of which is in the diametrical plane of said lower end section and the other side at an acute angle to the axis of the screw inclined in the same direction as said threads, whereby to define a V-shaped piercing edge on the tapered point and a reaming edge on the periphery of the lower end section which leads in the same direction as that in which the screw is turned to thread into the metal and having projections defined on its upper end portion by at least the last two threads for starting the tapping of threads in an unthreaded hole, said recessed lower end section being adapted first to pierce a non-circular hole in the sheet metal having a rounded flared entrance and then in the rotation of the screw round out and enlarge the hole preliminary to tapping and thereby also swedge the metal to define a rough flange around the hole on the opposite side from the entrance, which flange is also tapped as an extension of the hole in the tapping of the hole by said screw, the relief afforded by said annular groove leaving the last threads fully exposed and insuring better starting of the threads in the tapping of threads in the hole.

2. A screw for piercing a hole in sheet metal and tapping the hole as the screw is screwed in to a tightened position, said screw comprising an elongated shank terminating at its upper end in a head and at its lower end in a tapered point adapted for piercing a hole in the material, said shank having V-shaped threads of relatively coarse pitch provided thereon in one continuous length on an upper holding section and a lower tapping and entering section, the thread convolutions on the lower entering section diminishing in external diameter toward the lower end but having sharp peripheries all the way to the lower end to facilitate entrance in an unthreaded hole and start the tapping thereof, the threads on the lower entering section being traversed by a substantially right angle groove, one side of which is in the diametrical plane of said entering section and the other side at an acute angle to the axis of the screw inclined in the same direction as the threads, whereby to define a V-shaped piercing edge on the tapered point, and a reaming edge on the periphery of said entering section which leads in the same direction as that in which the screw is turned to thread into the hole, said tapered lower end being adapted first to pierce a non-circular hole in the sheet metal having a rounded flared entrance and then in the rotation of the screw round out and enlarge the hole preliminary to tapping and thereby also swedge the metal to define a rough flange around the hole on the opposite side from the entrance that is also tapped as an extension of the hole in the tapping of the hole by said screw, said screw's lower end portion having an annular groove of appreciable width and depth in relation to the thickness of the sheet metal to be pierced provided therein spaced above the tapered point and intersected by said right angle groove.

3. A hole-piercing and thread-forming screw for use in sheet materials including a head and a shank integral thereof having an upper holding threaded section and a lower entering and thread-forming section, the threads on the shank extending from the head to the vicinity of the lower entering and thread-forming section, the terminal end of said entering and thread-forming section which is furthest removed from said head presenting a piercing point of tapered configuration, said piercing point being located on the axis of the screw, an annular unthreaded groove intermediate the threaded portion of the shank and said piercing point, the surface of said groove being arcuate and extending from said threaded portion to said piercing portion, said groove having a maximum diameter less than the root diameter of the threaded portion of the shank, the entering section of the screw including the piercing point as well as said annular groove being recessed on one side to define a substantially right angle groove having one wall thereof substantially in the diametrical plane of the lower end of said entering section and coincidental with the axis of the screw and extending axially at least to the threaded portion of the shank, and having the other wall at an acute angle to the axis of the screw inclined in the same direction as said threads, whereby to define a V-shaped piercing edge on the tapered point and a reaming edge on the periphery of the lower end of said entering section which leads in the same direction as that in which the screw is turned to thread into the material, said other wall extending from and opening to one side of the shank downwardly to and opening on the opposite side of said shank and terminating at said tapered point, the lower end of said wall defining a piercing edge in contiguous and transverse relation to said V-shaped piercing edge, said piercing edges and reaming edge cooperable to progressively drill and ream a hole in the work piece as the screw is rotated relative to the complementary work piece, the aforesaid annular groove providing only a predetermined amount of successive piercing and reaming edges to accomplish the drilling and reaming action and further providing an annular tapered entering end section to facilitate initial threaded engagement of the initial screw threads with the drilled and reamed aperture previously formed in the complementary work piece.

4. A screw device for piercing and tapping a hole in a work piece of the type described in claim 3 wherein the substantially right angle groove in said entering section extends axially into the threaded portion of the shank to provide a serrated cutting edge to cut threads in the work piece aperture as the screw is rotated relative to said work piece.

References Cited in the file of this patent

UNITED STATES PATENTS

| | | |
|---|---|---|
| 385,088 | Benzie | June 26, 1888 |
| 1,867,526 | Anderson | July 12, 1932 |
| 2,053,918 | Peretzman | Sept. 8, 1936 |
| 2,403,359 | Gerhold | July 2, 1946 |

FOREIGN PATENTS

| | | |
|---|---|---|
| 833,028 | France | July 11, 1938 |